United States Patent [19]
Hicks et al.

[11] 3,935,918
[45] Feb. 3, 1976

[54] DUAL SOURCE HYDRAULIC STEERING SYSTEM

[75] Inventors: Leon E. Hicks; Wayne A. Peterson; Lawrence F. Schexnayder, all of Joliet, Ill.

[73] Assignee: Caterpillar Tractor Co., Peoria, Ill.

[22] Filed: Sept. 9, 1974

[21] Appl. No.: 504,055

[52] U.S. Cl. .............................. 180/79.2 R; 60/405
[51] Int. Cl.² ............................................ B62D 5/08
[58] Field of Search .................. 180/79.2 R, 79.2 B; 60/405; 137/113, 117

[56] References Cited
UNITED STATES PATENTS

| | | | |
|---|---|---|---|
| 3,424,262 | 1/1969 | Kunz.............................. | 180/79.2 R |
| 3,653,209 | 4/1972 | Mac Duff.................... | 180/79.2 R X |
| 3,719,249 | 3/1973 | Becker........................... | 180/79.2 R |
| 3,838,570 | 10/1974 | Marietta..................... | 180/79.2 R X |

Primary Examiner—M Henson Wood, Jr.
Assistant Examiner—John A. Pekar
Attorney, Agent, or Firm—Phillips, Moore, Weissenberger

[57] ABSTRACT

A method and plural embodiments of apparatus for delivering a pressure-compensated supply of fluid to a hydraulic steering circuit, wherein first and second pumps are respectively operated by a vehicle engine and by a ground wheel when the vehicle is in motion, output fluid from the two pumps being simultaneously directed to the steering circuit by a control valve with inlet relief valve means modulating output pressure of the sources in response to operation of the control valve. One embodiment contemplates dual inlet relief valves for separately modulating output from the two pumps while another embodiment contemplates one of the pumps having a variable output.

9 Claims, 3 Drawing Figures

DUAL SOURCE HYDRAULIC STEERING SYSTEM

BACKGROUND OF THE INVENTION

The present invention relates to a dual-source fluid supply system for a hydraulic circuit and more particularly to a steering system for a vehicle wherein two sources or pumps which deliver fluid under pressure to a steering circuit are driven by different elements of the vehicle to assure a continuous supply of fluid.

The prior art has recognized the need for auxiliary pumps to assure continuity of hydraulic pressure in vehicular steering circuits during emergency situations. A main or primary pump for supplying fluid under pressure to a vehicular steering circuit is commonly driven directly by the vehicle engine or prime mover. Accordingly, depressurization of the steering circuit may occur when the vehicle engine stops operating or when the primary engine-driven pump fails or becomes inoperative. A pressure failure in the steering circuit may have severe consequences, particularly upon large vehicles such as earth moving machinery where the size of the machinery makes manual steering difficult if not impossible.

Accordingly, it has become common, particularly for large machines, to provide a secondary or auxiliary pump for delivering fluid under pressure to the steering circuit in the event that the main pump fails or becomes inoperative for one reason or another. The auxiliary pump may be driven by rotation of a vehicle wheel, for example, through an output element of a vehicle transmission. Such auxiliary pumps are also commonly designed for reversible operation so that the pump will be capable of delivering fluid under pressure to the steering circuit regardless of the direction of vehicle operation.

Typical references disclosing the use of an auxiliary or secondary pump to provide fluid under pressure when a primary pump fails include U.S. Pat. Nos. 3,625,240; 3,407,894; 3,424,262; and 3,613,818, the last noted patent being assigned to the assignee of the present invention. U.S. Pat. No. 3,566,749, also assigned to the assignee of the present invention, further discloses a manually operable, emergency pumping unit for use in the absence of output pressure from a main pump.

Summary of the Invention

The present invention has a basic purpose of employing a second pump to constantly deliver fluid under pressure to a hydraulic circuit such as the steering system referred to above in order to realize numerous advantages. For example, constant use of the second pump permits the primary pump to be reduced in size since it will normally not be required to supply the full fluid flow requirements for the hydraulic circuit. Additionally, as will be made apparent from the following description, the constant use of two pumps further assures continued pressurization within the hydraulic circuit even in the event that one pump fails while further enhancing or facilitating operation of the hydraulic circuit.

Accordingly, it is an object of the invention to provide a fluid supply system including two sources of fluid under pressure which are separately driven while being communicated in unison with a hydraulic circuit through a control valve associated with an inlet relief valve for modulating fluid pressure from the sources as required within the hydraulic circuit.

It is a further object of the invention to provide a method of supplying two sources of fluid under pressure and selectively communicating them at the same time to a hydraulic circuit while blocking cross-flow between the sources in the event one of the sources should fail and modulating fluid pressure from the sources for communication to the hydraulic circuit.

It is a further object of the invention to adapt both the apparatus and method referred to above for use in the steering circuit of a vehicle with the second pump being effectively driven by rotation of a vehicle wheel while the vehicle is in motion.

Additional objects and advantages of the present invention are made apparent in the following description having reference to the accompanying drawings.

DESCRIPTION OF THE PREFERRED EMBODIMENTS

Figure 1:
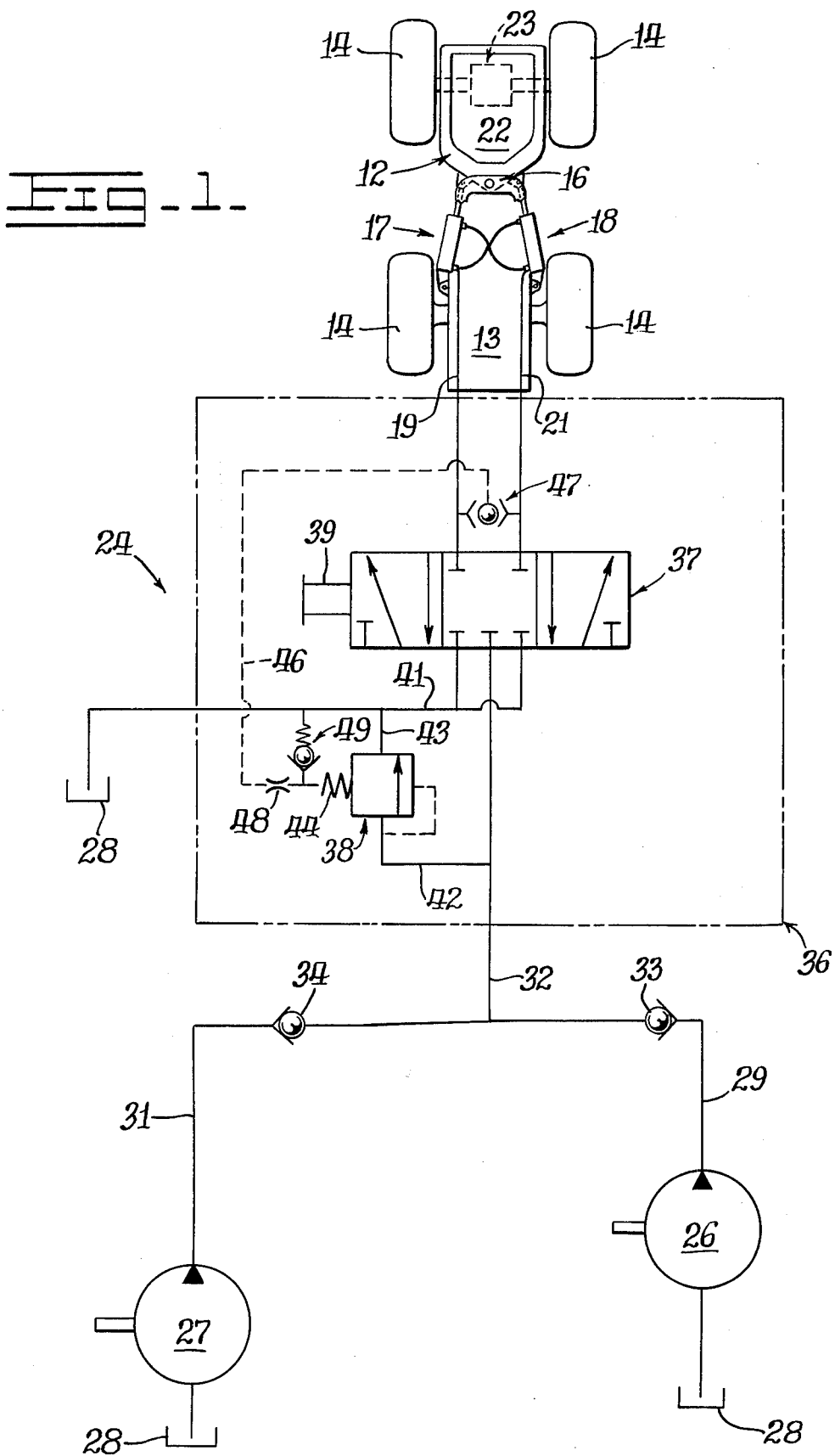
FIG. 1 is a schematic representation of a dual-source, fluid supply system according to the present invention adapted for use in the steering system of a vehicle.

The dual-source, fluid supply system of the present invention is contemplated for use in various hydraulic circuits. However, the invention is described below with particular reference to a steering system for a vehicle such as that indicated at 11 in FIG. 1. The vehicle includes articulated sections 12 and 13 each mounted upon ground engaging wheels 14 and pivotably connected at an axis of articulation indicated at 16.

Steering is accomplished by operation of a pair of double-acting hydraulic jacks 17 and 18 which are pivotably interconnected between the articulated vehicle sections 12 and 13 in conventional fashion. A first hydraulic line 19 is communicated to the head end of the jack 17 and the rod end of the jack 18 while another hydraulic line 21 is in communication with the head end of the jack 18 and the rod end of the jack 17. Accordingly, fluid pressure in the line 19 causes the vehicle to turn to the right as viewed in FIG. 1 while pressurization of the hydraulic line 21 causes the vehicle to turn to the left.

The vehicle is further of a type including a prime mover or engine 22 which is coupled to one or more of the ground engaging wheels, for example, by means of a drive train or transmission generally indicated at 23.

A fluid supply system provided by the present invention is indicated at 24 and includes a first pump or source of fluid under pressure 26 which is driven by the vehicle engine 22. A second pump or source of fluid under pressure 27 is driven by rotation of one of the vehicle ground wheels 14, for example, by means of a final output drive member (not shown) within the drive train 23. The two pumps 26 and 27 are adapted to draw fluid from a common tank 28 and direct fluid under pressure through respective conduits 29 and 31 into a common fluid conduit 32. Each of the output conduits 29 and 31 for the respective pumps includes a separate one-way check valve 33 or 34 to prevent cross-flow between the pumps in the event that one of them should fail or become inoperable.

Fluid in the conduit 32 is directed toward a composite valve assembly indicated at 36 which comprises a steering control valve 37 and a fluid responsive, inlet relief valve 38. The steering control valve 37 is of a conventional type which is operated by rotation of a steering wheel (not shown) for the vehicle 11, for example, through a mechanical linkage such as that disclosed in U.S. Pat. No. 3,260,325, that patent also being signed to the assignee of the present invention. Alternatively, the steering control valve 37 could also be pilot-operated, again in a conventional fashion.

The steering control valve 37 includes a control spool 39 which is selectively movable in either direction from the neutral position illustrated in FIG. 1 to communicate its inlet conduit 32 with one of the hydraulic lines 19 and 21 which connect with the jacks 17 and 18. When the control valve 37 is positioned to direct pressurized fluid through either of the lines 19 and 21, the other line is communicated with the common drain 28 through a drain conduit 41.

The inlet relief valve 38 has an inlet conduit 42 in communication with the conduit 32 and an outlet conduit 43 in communication with the drain conduit 41. The inlet relief valve 38 is of a type tending to resist fluid communication from the conduit 42 to the outlet conduit 43 in response to action of a spring 44 and fluid pressure in a signal conduit 46. The signal conduit 46 is in selective communication with one of the hydraulic lines 19 and 21 depending upon the position of a ball resolver or shuttle-type valve indicated at 47. A restrictive orifice 48 in the conduit 46 serves to adjust the rate of pressure modulation accomplished within the conduit 32 by means of the valve 38. A conventional poppet relief valve 49 also communicates the signal conduit 46 with the drain conduit 41 in order to prevent excessive pressurization within the composite valve assembly 36.

In operation of the FIG. 1 embodiment, the engine driven pump 26 commences to deliver fluid under pressure to an inlet of the steering control valve 37 through the conduits 29 and 32 after start up of the vehicle engine. The second pump 27 also commences to deliver fluid under pressure through the conduits 31 and 32 once the vehicle 11 is set in motion. Normally, fluid pressure developed within the conduit 32 by the pumps 26 and 27 is relieved to the drain 28 through the inlet relief valve 38 and the drain conduit 41.

When the steering control valve 37 is shifted in either direction, fluid from the conduit 32 is communicated into one of the conduits 19 and 21 to change direction of the vehicle 11. That pressure is communicated through the signal conduit 46 to condition the inlet relief valve 38 for increasing or modulating pressure within the conduit 32. Accordingly, fluid is delivered from the conduit 32 to the steering jacks 17 and 18 in pressure-compensated, flow controlled fashion across the steering control valve 37.

The pumps 26 and 27 are preferably sized or selected so that each provides a substantial portion of the fluid requirements for the steering jack 17 and 18 at a predetermined, relatively low ground speed of the vehicle 11. Also, the spring 44 within the inlet relief valve 38 is selected along with fluid responsive characteristics of the inlet relief valve so that the valve 38 in combination with the two pumps 26 and 27, provides generally constant modulated fluid pressure to the steering control valve 37 once the inlet relief valve 38 reaches an equilibrium condition in response to fluid pressure from the signal conduit 46.

Figure 2:
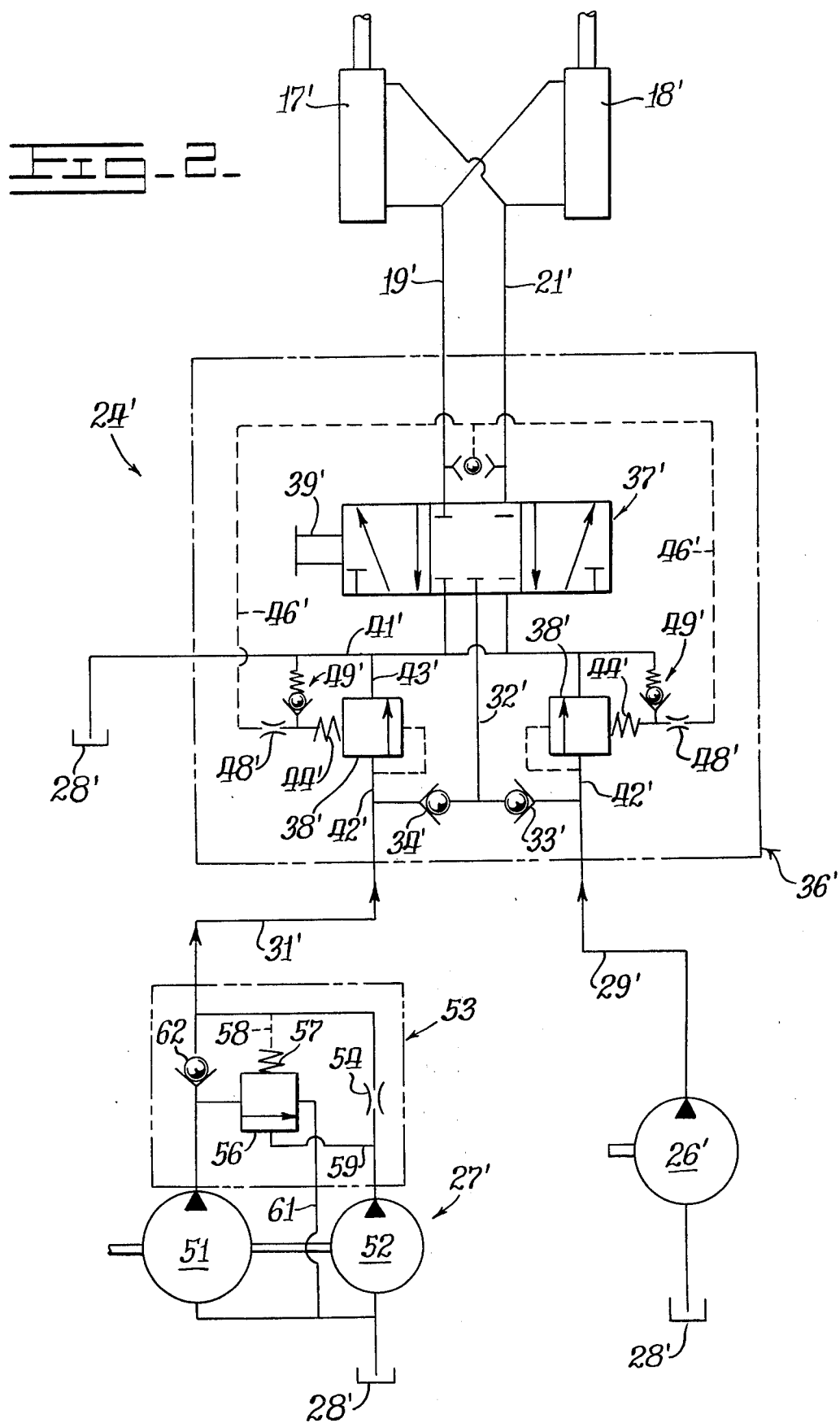
FIGS. 2 and 3 are similar schematic representations to illustrate additional embodiments of the dual-source, fluid supply system.

The embodiment of FIG. 2 is similar to the embodiment of FIG. 1 as described above in many respects. Accordingly, similar primed numerical labels are employed to identify elements corresponding to those described above in connection with FIG. 1.

The embodiment of FIG. 2 differs primarily as to the manner in which fluid pressure is modulated within the inlet conduit 32' for the steering control valve 37'. Additionally, the wheel driven pump 27' has dual operating sections 51 and 52 which may be selectively operated in order to adapt their output to requirements of the steering jacks 17', 18', and operating characteristics of the vehicle 11 (see FIG. 1).

It is particularly contemplated that both of the pumps 51 and 52 are communicated with the conduit 31' by means of a cut-out valve 53. The valve 53 is of a conventional type and may be integrally formed together with the two pump sections 51 and 52 for the purpose of combining output flow from the two pumps until output flow from one of the pumps 52 approaches a predetermined flow rate. At that time, the cut-out valve 53 causes output fluid from the other pump section 51 to be directed back to the drain 28'. In this manner, the wheel driven pump assembly 27' provides increased fluid delivery at lower ground speeds of the vehicle in order to assure adequate operating pressure for the jacks 17' and 18'.

The cut-out valve 53 accomplishes its function by means of a restrictive orifice 54 which communicates fluid from the pump section 52 to the conduit 31'. Output fluid from the other pump section 51 is also in communication with the fluid responsive relief valve 56 which responds to a spring 57 and fluid pressure in a conduit 58 in order to direct fluid output from the pump section 51 into the conduit 31'. As ground speed of the vehicle and output pressure of the pump section 52 both increase, the restrictive orifice 54 causes a pressure rise which is communicated to the relief valve 56 through a conduit 59. Increased fluid pressure within the conduit 59 biases the relief valve 56 into an open position with output fluid from the pump section 51 returning to the common drain 28' through a drain conduit 61. Output fluid from the pump section 52 is prevented from entering the other pump section 51 by means of a check valve 62.

As noted above, a separate inlet relief valve 38' is separately associated with output fluid from the engine driven pump 26' and with the wheel driven pump assembly 27'. Associated elements such as the signal conduit 46', the restrictive orifice 48' and the relief valve 49' are also provided in duplicate with the check valves 33' and 34' being relocated to block undesirable cross-flow between the inlet relief valves 38' as well as between the two pumps 26' and 27'.

With this arrangement, each inlet relief valve tends to separately regulate fluid communicated from the respective pump to the steering jack 17' and 18' through the steering control valve 37'. Additionally, the duplicate inlet relief valves 38' together with the arrangement of the check valves 33' and 34' provide an additional safety factor in the event that one of the inlet relief valves should happen to stick in an open position. With the arrangement illustrated in FIG. 2, the other inlet relief valve would continue to supply modulated fluid through the control valve 37' from its associated pump.

Figure 3:
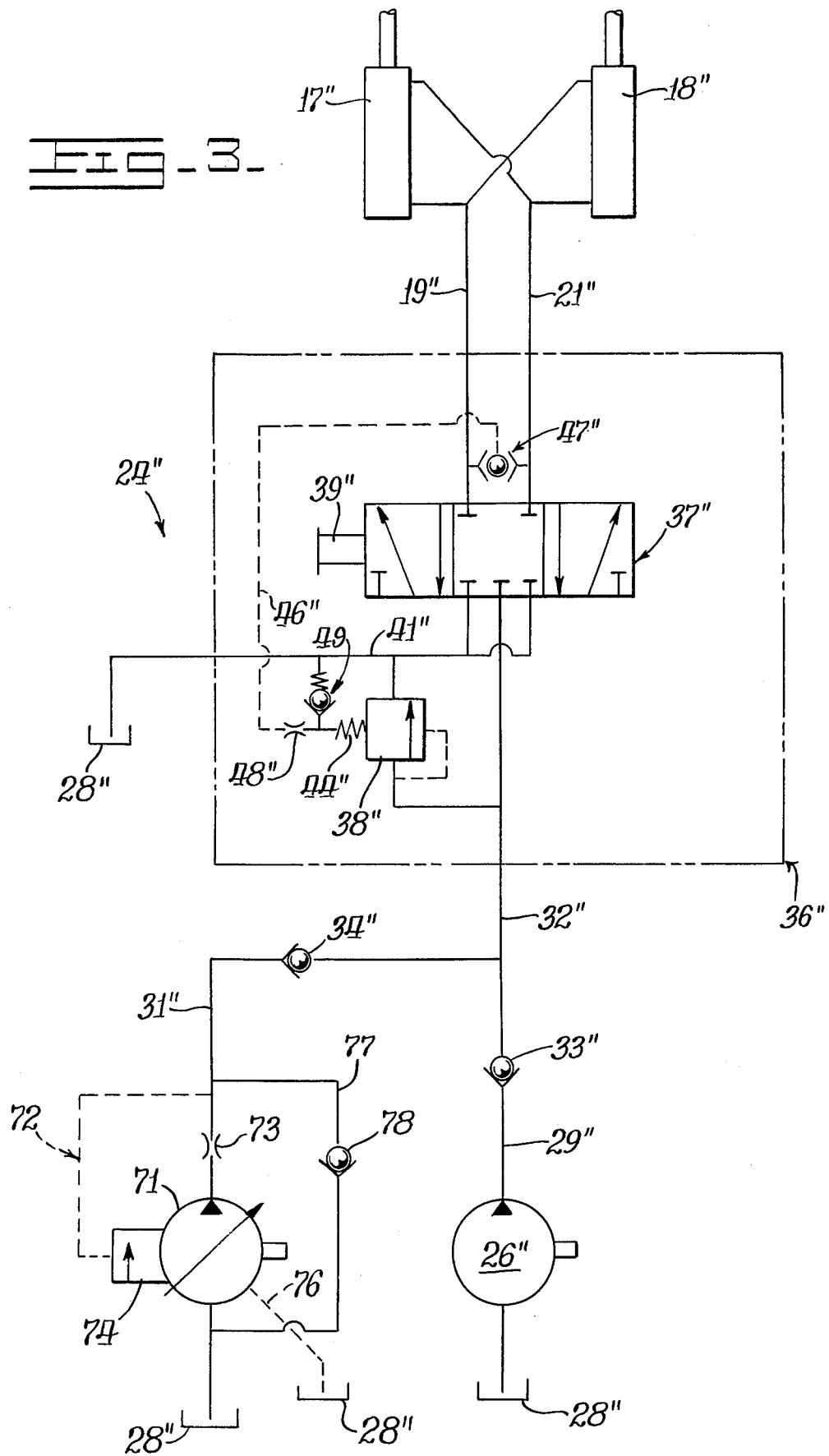

Finally, the embodiment of FIG. 3 is again very similar to the embodiment of FIG. 1. Accordingly, those elements of FIG. 3 which correspond with similar elements of FIG. 1 are labelled with similar, double primed numerical labels. Generally the FIG. 3 embodiment differs from the FIG. 1 embodiment only in that the wheel driven pump 27 is replaced by a variable displacement pump 71. Associated control elements limit fluid flow from the variable displacement pump at a predetermined maximum level. For this purpose, the associated controls include a restrictive orifice 73 communicating the pump 71 with the conduit 31" and a signal conduit 72 communicating conduit 31" with a flow compensator 74. As output fluid flow from the pump 71 approaches the predetermined maximum level, the restrictive orifice 73 develops a sufficient pressure drop to cause flow compensator 74 to reduce the displacement of the pump to maintain a maximum output flow. A conduit 76 communicates with tank 28" to provide a pump case drain. A by-pass conduit 77 including a check valve 78 is conventionally communicated between the inlet and outlet sides of the pump 71 to prevent cavitation during reverse operation of the vehicle 11 (See FIG. 1).

It will be obvious that in connection with any of the three embodiments described above, either of the two pumps or pump assemblies will continue to deliver fluid under pressure to the steering system of the vehicle 11 through the steering control valve in the event that the other pump or pump assembly fails or becomes inoperable. Otherwise, both of the pumps or pump assemblies tend to be operable and each normally supplies a substantial portion of the fluid requirements for the steering system of the vehicle.

We claim:

1. A steering system for a vehicle having a prime mover and wheels, one or more of the wheels being coupled with the prime mover through a suitable drive train, comprising
    a hydraulic motor means for effecting vehicle steering,
    a first hydraulic pump coupled for operation by the prime mover,
    a second hydraulic pump effectively coupled for operation by rotation of one of the wheels,
    a steering control valve having inlet means in communication with the two pumps and outlet means in communication with the steering motor means, the control valve being operable to selectively communicate both of the first and second pumps with the steering motor means, and
    a fluid responsive inlet relief valve means communicating the inlet means of the control valve with a drain, the relief valve means being in communication with the outlet means of the control valve by a signal conduit, the relief valve means including means responsive to fluid pressure from the signal conduit for causing the relief valve means to selectively limit fluid communication from the inlet means to the drain.

2. The steering system of claim 1 wherein the two pumps are selected to each provide a substantial portion of the fluid requirements for the steering motor means at a predetermined, relatively low ground speed of the vehicle.

3. The steering system of claim 2 wherein the characteristics of the inlet relief valve means are selected in combination with the pumps to provide constant pressure within the control valve inlet means independent of engine speed and ground speed.

4. The steering system of claim 1 further comprising check valve means communicating each pump with the steering control valve in order to block fluid flow between the pumps upon failure of one pump to operate.

5. The steering system of claim 4 further comprising a shuttle-type valve for communicating the outlet means of the steering control valve with the signal conduit, the signal conduit including a restrictive orifice, a relief valve communicating a drain with the signal conduit between the orifice and inlet relief valve means.

6. The steering system of claim 1 further comprising a separate inlet relief valve means in communication with the outlet of each pump in order to separately regulate fluid communicated from each pump to the steering motor means through the steering control valve.

7. The steering system of claim 6 further comprising check valve means arranged between each inlet relief valve means and the steering control valve to prevent cross-flow between the two inlet relief valve means.

8. The steering system of claim 1 further comprising an additional wheel-driven pump means being selectively operable to provide increased fluid flow at relatively low ground speeds.

9. The steering system of claim 1 wherein the second pump is a variable displacement-type pump.

* * * * *